(12) United States Patent
Laubstein et al.

(10) Patent No.: US 7,677,113 B2
(45) Date of Patent: Mar. 16, 2010

(54) WEIGHING SYSTEM WITH PLURAL WEIGHING CELLS

(75) Inventors: Michael Laubstein, Goettingen (DE); Otto Kuhlmann, Goettingen (DE); Detlev Erben, Goettingen (DE); August Heine, Bodensee (DE); Juergen Lauke, Rosdorf (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 11/949,522

(22) Filed: Dec. 3, 2007

(65) Prior Publication Data
US 2008/0087103 A1 Apr. 17, 2008

Related U.S. Application Data

(63) Continuation of application No. PCT/EP2006/005128, filed on May 30, 2006.

(30) Foreign Application Priority Data
Jun. 3, 2005 (DE) .................. 10 2005 025 534

(51) Int. Cl.
  *G01D 7/00* (2006.01)
(52) U.S. Cl. .................. 73/862.046
(58) Field of Classification Search ..........
  73/862.041–862.046
  See application file for complete search history.

(56) References Cited

U.S. PATENT DOCUMENTS

| | | | |
|---|---|---|---|
| 3,773,124 A | 11/1973 | Bullivamt | |
| 3,966,001 A | 6/1976 | Goldberg | |
| 4,794,365 A | 12/1988 | Dunbar | |
| 5,010,772 A * | 4/1991 | Bourland et al. | 73/862.046 |
| 5,289,722 A * | 3/1994 | Walker et al. | 73/775 |
| 5,304,745 A | 4/1994 | Rusk et al. | |
| 5,393,935 A * | 2/1995 | Hasty et al. | 177/45 |
| 5,393,938 A * | 2/1995 | Bumbalough | 177/144 |
| 5,623,128 A | 4/1997 | Grimm et al. | |
| 5,646,376 A * | 7/1997 | Kroll et al. | 177/211 |
| 5,719,357 A | 2/1998 | Eger et al. | |
| 5,750,937 A * | 5/1998 | Johnson et al. | 177/25.11 |
| 5,823,278 A * | 10/1998 | Geringer | 177/144 |
| 5,894,112 A * | 4/1999 | Kroll | 177/134 |
| 6,034,334 A | 3/2000 | Nakamura et al. | |
| 6,118,083 A * | 9/2000 | Boyovich et al. | 177/136 |
| 6,239,389 B1 * | 5/2001 | Allen et al. | 178/18.01 |
| 6,331,682 B1 * | 12/2001 | Hopkins et al. | 177/154 |

(Continued)

FOREIGN PATENT DOCUMENTS

DE 2113880 9/1972

(Continued)

OTHER PUBLICATIONS

Checkweighing Solutions, Starweigh Checkweigher, Mettler-Toledo, undated Catalog.

(Continued)

*Primary Examiner*—Max Noori
(74) *Attorney, Agent, or Firm*—Sughrue Mion, PLLC

(57) ABSTRACT

A weighing system (1) with a plurality of weighing cells for respectively weighing a plurality of materials. The weighing cells have essentially the same configuration, are arranged interchangeably in a two-dimensional array, are releaseably fixed on a support element (6) and have electrical connectors.

20 Claims, 3 Drawing Sheets

U.S. PATENT DOCUMENTS

| | | | |
|---|---|---|---|
| 6,386,051 B1 * | 5/2002 | Yoshimi et al. | 73/862.046 |
| 6,552,278 B2 * | 4/2003 | Johnson | 177/134 |
| 6,603,082 B1 * | 8/2003 | Delbruck et al. | 177/132 |
| 6,615,638 B1 | 9/2003 | Lochner et al. | |
| 6,616,369 B2 * | 9/2003 | Clark | 404/10 |
| 6,639,157 B2 * | 10/2003 | Sternberg et al. | 177/144 |
| 6,792,371 B1 * | 9/2004 | Turner | 702/101 |
| 6,864,436 B1 * | 3/2005 | Nobes et al. | 177/25.13 |
| 7,009,118 B2 * | 3/2006 | Pottebaum et al. | 177/136 |
| 7,194,922 B2 * | 3/2007 | Bucher et al. | 73/862.623 |
| 7,250,577 B2 | 7/2007 | Schilling et al. | |
| 7,271,352 B2 * | 9/2007 | Rabindran | 177/25.15 |
| 7,429,705 B2 * | 9/2008 | Genoud et al. | 177/210 EM |
| 2003/0218467 A1 | 11/2003 | Carlson et al. | |
| 2004/0058564 A1 | 3/2004 | Gesuita et al. | |
| 2006/0096790 A1 | 5/2006 | Muehlich et al. | |
| 2006/0201719 A1 | 9/2006 | Burkhard | |
| 2006/0266562 A1 | 11/2006 | Genoud et al. | |
| 2006/0289207 A1 | 12/2006 | Burkhard et al. | |

FOREIGN PATENT DOCUMENTS

| | | |
|---|---|---|
| DE | 3615598 A1 | 11/1986 |
| DE | 4427088 C2 | 2/1996 |
| DE | 10242118 A1 | 6/2003 |
| DE | 10326699 B3 | 1/2005 |
| EP | 1400789 A | 3/2004 |
| JP | 08015057 A | 1/1996 |
| JP | 11083645 A | 3/1999 |

OTHER PUBLICATIONS

"Where precision in dynamic weighing . . .", WIPOTEC, 1997 Catalog.

* cited by examiner

WEIGHING SYSTEM WITH PLURAL WEIGHING CELLS

This is a Continuation of International Application PCT/EP2006/005128, with an international filing date of May 30, 2006, which was published under PCT Article 21(2) in German, and the disclosure of which is incorporated into this application by reference.

BACKGROUND OF THE INVENTION

1. Field of the Invention

The invention relates to a weighing system with a plurality of weighing cells for separately weighing a plurality of materials.

2. Description of the Related Art

Weighing cells are functional units for determining weight, which include a weighing unit within a housing and the electronics necessary for operation. The weighing cells also store the calibration parameters specific to the weighing unit. The downstream electronics, e.g., the signal processing unit, may be arranged either within or outside the weighing cell.

A person skilled in the art will be familiar with multiple arrangements of individual weighing cells in weighing systems. Such cells are required in industrial processes wherever the weight of many individual small amounts of material, whose individual weight is often very low, must be determined at short time intervals. Examples include, among others, dosing and quality monitoring processes, e.g., in the pharmaceutical industry.

When deciding the size of a weighing cell, the geometric size of the weighing unit is considered. Since the geometric size of the weighing units suitable for such processes are large in relation to the material being weighed, the weighing cells are almost exclusively provided in single-row, linear arrangements. Only when particularly narrow weighing units are used is it possible to space the individual load sensors closely together.

Geometrically larger weighing units may also be staggered in height, such that special arms fixed to the force application points of the weighing units make it possible to space the individual load sensors closely together. The separate arms on the weighing units differ individually depending on the position of the weighing cell within the weighing system. Such an arrangement is known in U.S. Pat. No. 6,615,638 B1. The cost of designing and building weighing systems of this kind is very high because each separate weighing cell within the weighing system differs individually. This also presents problems when such weighing systems have to be serviced and repaired. Functionally reliable arrangements of weighing cells, e.g., in a two-dimensional array, with closely spaced individual load sensors at distances ranging from one to five centimeters, and a positional tolerance of the load sensors of a few tenths of a millimeter, can be realized with conventional weighing cells only at great cost.

OBJECT OF THE INVENTION

An object of the invention is to provide a weighing system having a plurality of weighing cells, which is simple and cost-effective to assemble and which simplifies servicing.

SUMMARY OF THE INVENTION

In one aspect of the invention, this object is achieved in that the weighing cells of the weighing system have a substantially identical configuration, are arranged interchangeably in a two-dimensional array, are releaseably fixed on a carrier element and are provided with an electrical connector.

Because the weighing cells in the weighing system are identical and separately removable it is sufficient to keep one weighing cell in reserve for servicing or repair. Through a suitable configuration of the fixation means, the individual weighing cell can be inserted into the system very precisely, so that there is no need for adjustments or calibration or for the entire system to be disassembled for servicing. With insertion, the electrical connections necessary for operating the weighing cells are also established by plug contacts. The electronics contained in the weighing cell provide the weighing signal to a downstream signal processing unit as well as the typical calibration parameters for the weighing cell.

In an exemplary embodiment, a carrier element, e.g., a plate with honeycomb recesses, is used to seat and mechanically fix the individual weighing cells. The precise fabrication of this carrier element and that of the complementary counterparts on the weighing cells make it possible to precisely position the individual weighing cells in both horizontal x, y directions and vertical z direction. To reduce a possible tilting error of the individual weighing cells and thus to ensure a precisely spaced alignment of the load sensors of the individual weighing cells, a fixation plate is provided, which is spaced apart from the carrier plate in z direction and the position of which in relation to the carrier plate is in turn determined by corresponding fixation elements. Electrical contacting of the electronics necessary to operate the individual weighing cells with the downstream signal processing unit is accomplished, in the simplest case, via a wiring board by means of plug contacts, such that each weighing cell is assigned a specific slot on the wiring board.

In an exemplary embodiment, the wiring board is below the carrier element, spaced at a distance therefrom in z direction. The board with the electronics required to operate the individual weighing cells has a connector which, in relation to the corresponding slot on the wiring board, is arranged in such a way that electrical contacting is effected simultaneously with the mechanical positioning of the weighing cells on the carrier plate.

The aspects of the invention will become evident particularly in weighing systems having weighing cells that are to be arranged in a two-dimensional array with at least 3×3 elements.

In an exemplary embodiment, two weighing cells each and their electronics are combined into a weighing module with two load sensors. By densely packing the two weighing units in relation to each other and arranging the two sets of electronics necessary to operate the weighing cells on a common board, it is possible to further reduce the space required by a weighing module compared to two individual weighing cells. Forming a weighing module also makes it possible to obtain a rectangular configuration of the weighing units. For individual weighing cells within an array that is equidistant in x and y direction, the individual weighing unit must be nearly square. For a weighing module having a lateral ratio of 1:2, the two weighing units it contains can be arranged in the longitudinal direction so that a lateral ratio of 1:4 can be obtained for the individual weighing unit. This neatly fits the structural configuration of the individual weighing units. It is of course also possible to integrate more than two weighing cells within a weighing module.

A housing enclosing the weighing module in cooperation with the functional elements described above forms a unit, which ensures that individual weighing modules can be easily replaced without adjustments or calibration.

BRIEF DESCRIPTION OF THE DRAWINGS

The invention will now be described in greater detail with reference to FIG. 1 to 3, in which.

DETAILED DESCRIPTION OF EXEMPLARY EMBODIMENTS OF THE INVENTION

Figure 1:
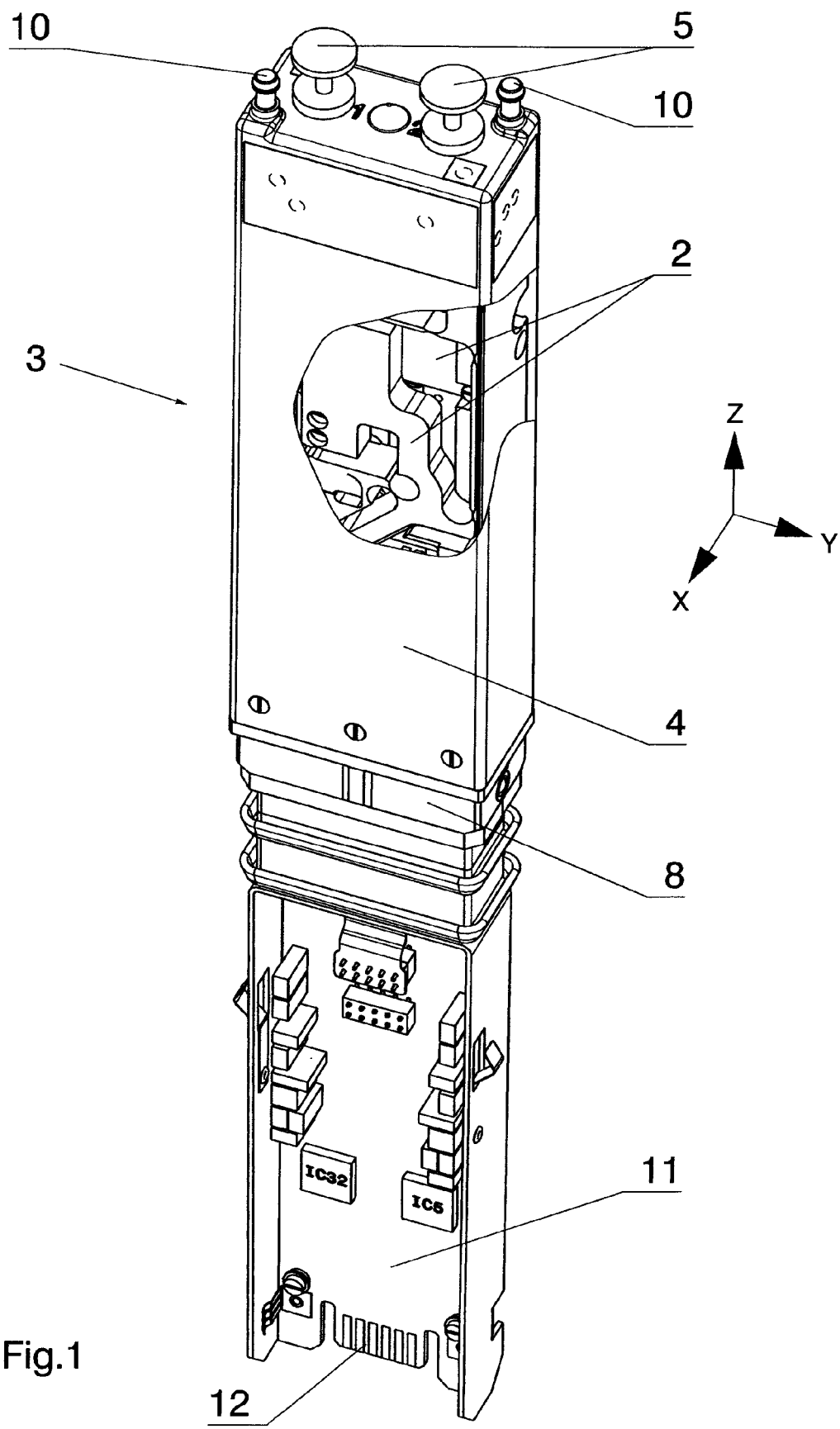
FIG. 1 shows a weighing module with two weighing units and their load sensors, common electronics for the two weighing units, the common housing and the means for mechanical fixation required for alignment within the weighing system.

As shown in FIG. 1, two identical weighing units 2 are combined into a weighing module 3 within a common housing 4. The housing 4 has passages for the load sensors 5 of the two weighing units 2 and fixation elements 10 arranged in their proximity. The collar 8 serves to seat and align the weighing module 3 in x, y and z direction in a carrier element 6, which is not depicted here. The fixation elements 10, in the installed state, in cooperation with the complementary recesses of the fixation plate 9, which is also not shown in FIG. 1, prevent any rotation about one of the three spatial axes. Possible geometric configurations of the collar 8 and the fixation elements 10 as well as their complementary recesses in the fixation plate 9 are familiar to one skilled in the art and will therefore not be further described here. Below the collar 8, the common electronics 11 for the two weighing units 2 are arranged. They include the necessary electronic components and a connector 12 for electrical contact with the signal processing unit.

Figure 2:
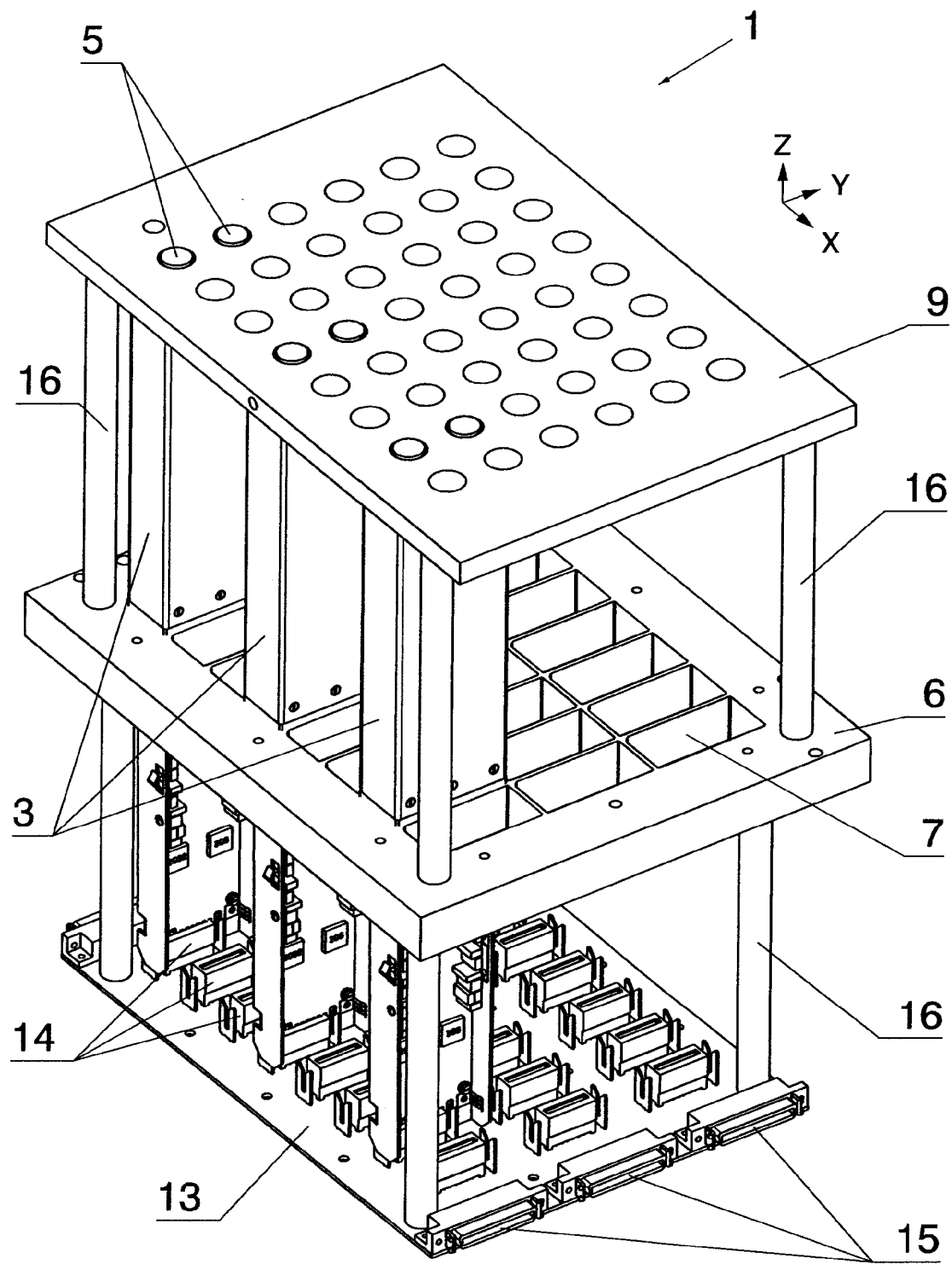
FIG. 2 shows a weighing system with a carrier element and some weighing modules arranged thereon, a fixation plate spaced at a distance in z direction and a wiring board arranged below the carrier element with the individual slots assigned to the respective weighing modules.

FIG. 2 shows the schematic construction of the weighing system 1 with several weighing modules 3 inserted into the honeycomb recesses 7 of the carrier element 6. Above the carrier element 6 is the fixation plate 9 and below the carrier element 6 the wiring board 13 with the individual slots 14. The wiring board 13 and the connectors arranged thereon establish the connection 15 to the signal processing unit (not depicted) of the weighing system 1. Connecting elements 16 position both the wiring board 13 and the fixation plate 9 in relation to the carrier element 6. For schematic illustration purposes, the connecting elements 16 are depicted here as columnar spacers. In other embodiments they can also be formed as correspondingly configured wall elements or housing elements of the weighing system 1. The fixation plate 9 forms the upper termination of the weighing system 1. It contains bores that allow the individual load sensors 5 of the weighing modules 3 to pass through. The individual load sensors 5 in this specific example form a rectangular equidistant array.

Figure 3:
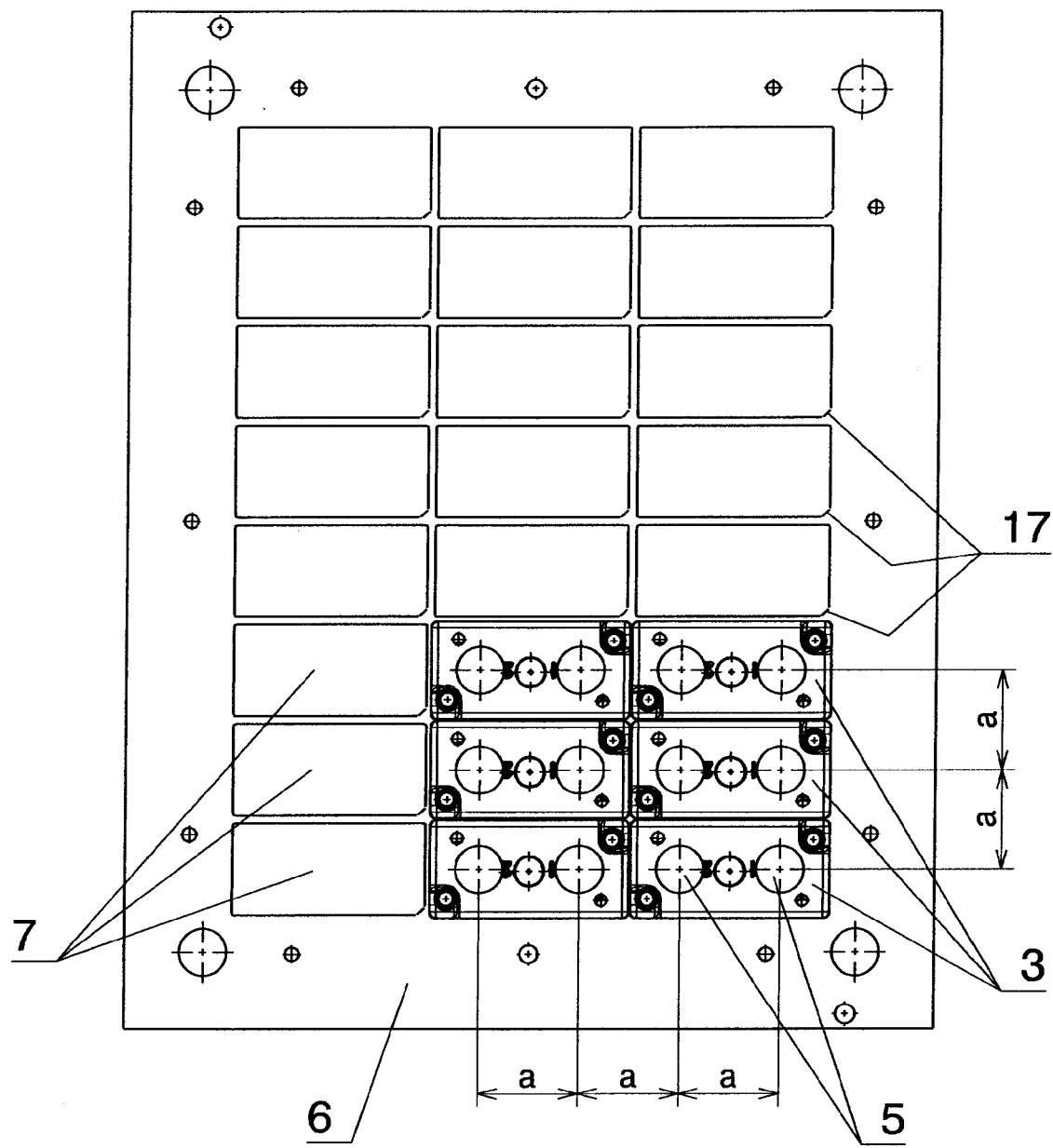
FIG. 3 is a top view showing a carrier element and a few weighing modules arranged thereon.

FIG. 3 is a top view of the carrier element 6 with the honeycomb recesses 7 and several inserted weighing modules 3. To ensure that the weighing modules 3 are all inserted in the same orientation, the honeycomb recesses 7 have a bevel 17 in one corner. The complementary counterpart to this bevel 17 is found again on the collar 8 of the weighing module 3. The same may also be achieved by other functional elements coding the orientation of the weighing modules 3, e.g., pins and corresponding bores.

The individual load sensors 5 of the weighing module 3 are located at the nodes of a rectangular equidistant array. In FIG. 3, the distances between nodes in the array are identified by (a).

The functionality of the weighing system 1 will now be described with reference to the replacement of a weighing module 3, without discussing the operation of the weighing system as such.

After the fixation plate 9 has been removed, e.g., during servicing, the individual weighing modules 3 can be easily replaced. This is done by pulling the corresponding weighing module 3, e.g., by the fixation elements 10, using a corresponding tool. The new weighing module 3 can then be inserted into the honeycomb recess 7 of the carrier element 6. The collar 8 ensures exact positioning in x and y direction as well as in z direction, while the bevel 17 of the honeycomb recess 7 ensures exact orientation. At the same time, the connector 12 ensures electrical contacting of the electronics 11 in the corresponding slot 14 of the wiring board 13. The wiring board in turn provides the connection 15 to the downstream signal processing unit. Putting on the fixation plate 9 ensures that any minor tilting error of the individual weighing modules arranged on the carrier element is corrected by the fixation elements 10 of the individual weighing modules 3, and the individual load sensors are in precisely spaced alignment in x and y direction in relation to each other.

If individual weighing cells are used in place of the weighing modules, positioning and contacting are effected correspondingly.

The above description of the exemplary embodiments of the invention has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A weighing system comprising:
    a plurality of weighing cells configured to respectively weigh a plurality of materials,
    wherein the weighing cells have substantially identical respective configurations, are arranged interchangeably in a two dimensional array, are each releasably fixed on a carrier element, and each have an electrical connector, and
    wherein each of the weighing cells comprises a respective load sensor that supports a respective one of the plurality of materials.

2. The weighing system as claimed in claim 1, wherein the weighing cells are arranged in an array with at least 3 ×3 elements.

3. A weighing system comprising:
    a plurality of weighing cells each independently configured to respectively weigh each of a plurality of materials,
    wherein groups comprising at least two of the weighing cells are combined into respective weighing modules and the weighing modules are releaseably fixed on a carrier element and have respective electrical connectors, and
    wherein the weighing modules each have substantially identical respective configurations, and are arranged interchangeably in a two dimensional array.

4. The weighing system as claimed in claim 3, wherein the weighing cells are or the weighing module is releasably fixed on the carrier element, and the weighing cells lift or the weighing module lifts upwardly from the carrier element to be removed from the array arrangement.

5. The weighing system as claimed in claim 1, wherein each weighing cell has individual load sensors and wherein the weighing cells have respective, substantially square base areas and are arranged such that the individual load sensors form a rectangular equidistant array.

6. The weighing system as claimed in claim 3, wherein the weighing module has individual load sensors, wherein the weighing module has a substantially rectangular base area, the length of one edge of the base area being approximately twice as long as the length of another edge of the base area, and wherein the weighing module is arranged such that the load sensors form a rectangular equidistant array.

7. The weighing system as claimed in claim 6, wherein a node distance (a) between the load sensors of the rectangular equidistant array is less than 3 cm.

8. The weighing system as claimed in claim 3, wherein the weighing cells are each enclosed by a housing or the weighing module is enclosed by the housing.

9. The weighing system as claimed in claim 1, wherein the weighing cells are arranged in a two-dimensional polar coordinate array.

10. The weighing system as claimed in claim 1, wherein the weighing cells have a hexagonal base area and are arranged in a honeycomb array.

11. The weighing system as claimed in claim 3, wherein the carrier element has honeycomb recesses for seating the weighing cells or weighing module, the weighing cells each have or the weighing module has a collar that is complementary to the honeycomb recesses of the carrier element, and the collar positions the weighing cells or weighing module in x, y and z directions when the weighing cells are or the weighing module is seated in the honeycomb recesses of the carrier element.

12. The weighing system as claimed in claim 3, further comprising a fixation plate arranged above the carrier element in a z direction, which corrects a tilting error of the individual weighing cells or the weighing module arranged on the carrier element with aid of fixation elements, wherein the fixation plate provides a relative, spatial alignment of individual load sensors of each of the weighing cells or of the weighing module in x and y directions.

13. The weighing system as claimed in claim 3, further comprising a wiring board arranged below and at a distance from the carrier element in a z direction, the wiring board having slots respectively assigned to each of the weighing cells or the weighing module for electrically contacting electronics that respectively correspond to the weighing cells or the weighing module with a downstream signal processing unit, whereby mechanical positioning of the weighing cells or the weighing module on the carrier element establishes the electrical contacting.

14. A weighing system, comprising:
a housing; and
a plurality of weighing modules,
the housing comprising:
a fixation plate having an array of holes formed therethrough;
a carrier element having an array of holes formed therethrough; and
a wiring board,
wherein the fixation plate is connected to the carrier element via first connecting elements and the carrier element is connected to the wiring board via second connecting elements,
wherein each of the plurality of weighing modules comprises weighing cells therein, load sensors at a first end and a connector at a second end thereof, and
wherein the load sensors are releasably retained in respective holes of the fixation plate, a body portion of each weighing module is releasably retained in a respective hole of the carrier element and the connector of each weighing module is releaseably connected to a respective connection slot of the wiring board.

15. The weighing system according to claim 14, wherein each of the plurality of weighing modules further comprises fixation elements that releaseably fix the respective weighing module to the fixation plate.

16. The weighing system according to claim 14, wherein the body portion of each weighing module comprises a collar that seats and aligns the weighing module in the carrier element.

17. A weighing cell for insertion in a weighing system, comprising:
means for releasably mechanically fastening to a weighing system carrier element;
electrical contacts;
fixation elements for aligning the weighing cell with respect to the carrier element; and
at least one functional element establishing an asymmetry in an exterior surface of the weighing cell and cooperating with said fastening means to prevent the weighing cell from fastening to the weighing system in an orientation other than a single predetermined orientation.

18. The weighing cell as claimed in claim 17, further comprising electronics configured to communicate with an external signal processing unit.

19. The weighing cell as claimed in claim 17, wherein the functional element comprises at least one of a beveled edge, a pin and a bore.

20. A weighing module for insertion into a weighing system, comprising:
two weighing cells supported in the module;
means for releasably mechanically fastening and electrically contacting the module with a weighing system carrier element; and
fixation elements for aligning the module with respect to the carrier element.

* * * * *